United States Patent [19]

Peterson

[11] Patent Number: 5,027,543
[45] Date of Patent: Jul. 2, 1991

[54] ATTACHMENT FOR FISHING LURE

[76] Inventor: James T. Peterson, 3216 Nobel Ave. No., Golden Valley, Minn. 55422

[21] Appl. No.: 539,804

[22] Filed: Jun. 18, 1990

[51] Int. Cl.⁵ .............................................. A01K 85/00
[52] U.S. Cl. ..................................... 43/42.25; 43/42.28
[58] Field of Search ................. 43/42.25, 42.26, 42.27, 43/42.28, 42.29

[56] References Cited

U.S. PATENT DOCUMENTS

| | | | |
|---|---|---|---|
| 1,929,150 | 10/1933 | Peckinpaugh | 43/42.27 |
| 2,738,610 | 3/1956 | Rice | 43/42.25 |
| 2,909,862 | 10/1959 | Minnite | 43/42.25 |
| 4,158,927 | 6/1979 | Capra | 43/42 |
| 4,751,789 | 6/1988 | Devereaux | 43/42.28 |
| 4,858,367 | 8/1989 | Rabideau | 43/42.28 |
| 4,875,305 | 10/1989 | Bridges | 43/42.06 |

Primary Examiner—Kurt Rowan
Assistant Examiner—Chuck Y. Mah
Attorney, Agent, or Firm—Merchant, Gould, Smith, Edell, Welter & Schmidt

[57] ABSTRACT

A fishing lure attachment includes a tuft having a first end and a second end and an elongated body, a trailing lock of strand-like reflective filaments extending from the tuft second end, and attachment means extending from the tuft first end.

15 Claims, 3 Drawing Sheets

ATTACHMENT FOR FISHING LURE

FIELD OF THE INVENTION

This invention generally relates to fishing lures and, more specifically, to fishing lure attachments which impart an attractive color, appearance, and scent.

DESCRIPTION OF THE PRIOR ART

Those who fish may use any variety of bait types or lures to attract and catch fish. For example, fishing lures are often designed with a distinctive color or appearance. Alternatively, fish hooks or lures are often used in combination with live bait such as worms, minnows, or various insects. However, it is often the case that a given fishing lure may lack certain color, configuration, or scent which might serve as an added attractive characteristic to any potential fish. Consequently, there is a need for a fish lure attachment which will additionally supplement the fish attracting features of any given lure.

SUMMARY OF THE INVENTION

In accordance with the present invention there is provided a fishing lure attachment comprising a tuft having an elongated body, a trailing lock of strand-like reflective filaments extending from the tuft, and means for attaching the lure attachment extending from the front end of the tuft.

The fishing lure attachment of the present invention is capable of providing fish attracting features including the carrying of a fish attracting scent, the use of a fish attracting color, and configuration which depicts a bait-fish like entity for attracting the fish.

DESCRIPTION OF THE PREFERRED EMBODIMENT

Figure 1:
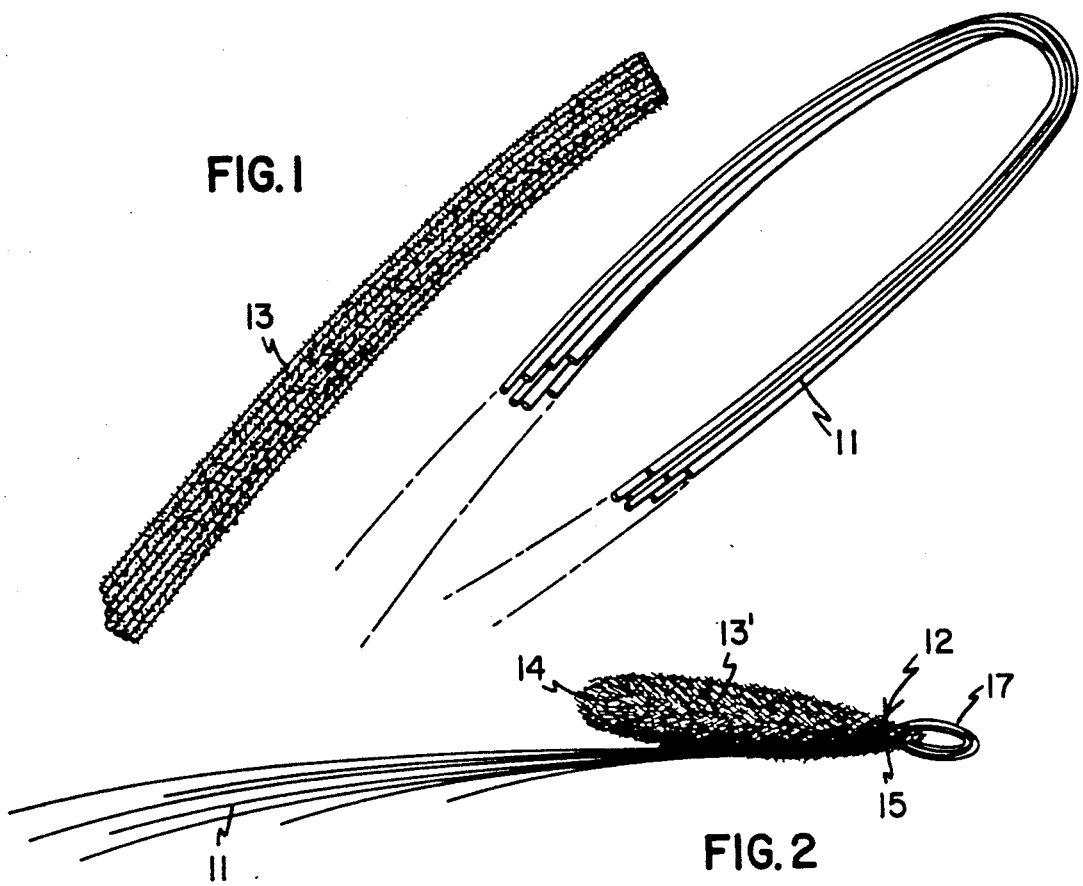
FIG. 1 is a perspective view depicting elements which may be used in the fabrication of the fishing lure attachment of the present invention.
Figure 2:
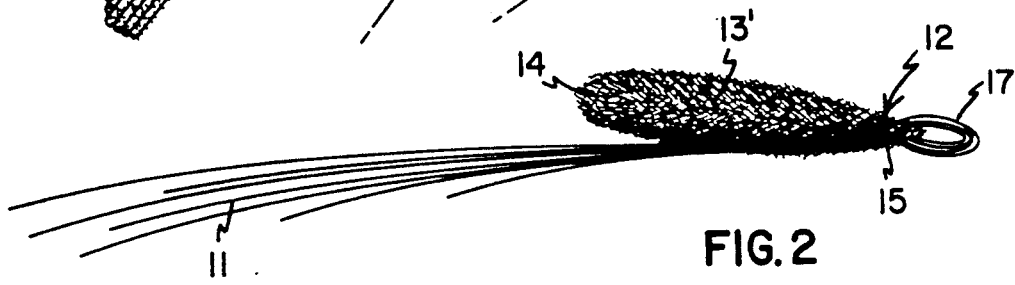
FIG. 2 is an elevational view of the fishing lure attachment of the present invention once fabrication is completed.

Referring to the figures wherein like numerals represent like parts throughout several views, there is generally shown in FIGS. 1 and 2 a fish lure attachment comprising a tuft 13' made from tuft strands 13 having an elongated body with a first end 12 which is adjacent to attachment means shown as loop 17 and a second end 14 beneath which extends a trailing lock of strand-like reflective Mylar (trade name) filaments 11. The tuft 13' is held in place in relation to the attaching loop 17 and the reflective filaments 11 by the application of adhesive 15 which is applied adjacent loop 17 at the tuft first end 12.

In making the fishing lure attachment of the present invention, a lock of filaments 11 is cut and gathered generally in the middle to form loop 17 as shown in FIG. 2. As the filaments 11 are gathered generally in the middle and folded, a loop 17 is created by the portion of the filaments 11. An adhesive 15 is subsequently applied at the gathered area 15 adjacent the first end 12 of the tuft 13. The tuft strands 13 are gathered and matted onto the lock of folded filaments 11 at that point to create the tuft 13', shown in FIG. 2. Instead of using adhesive, the tuft may be attached by thread or a metal clamp.

Figure 3:
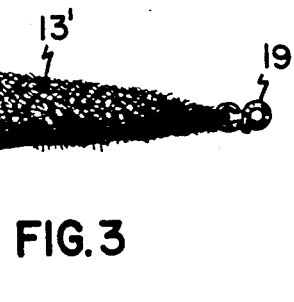
FIG. 3 is an elevational view of an alternative embodiment of the fishing lure attachment of the present invention once fabrication is completed.
Figure 4:
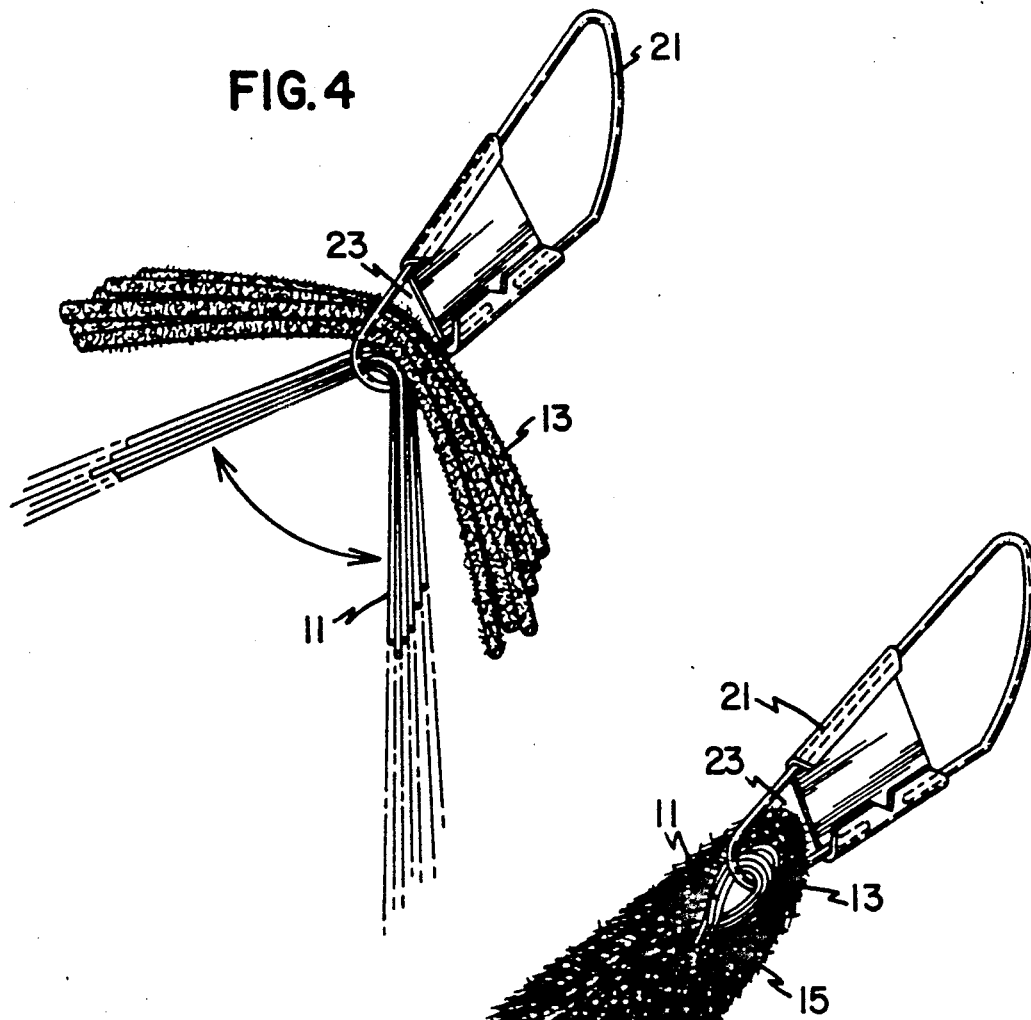
FIG. 4 is a perspective view of elements which may be used in the fabrication of an alternative embodiment of the fishing lure attachment of the present invention.
Figure 5:
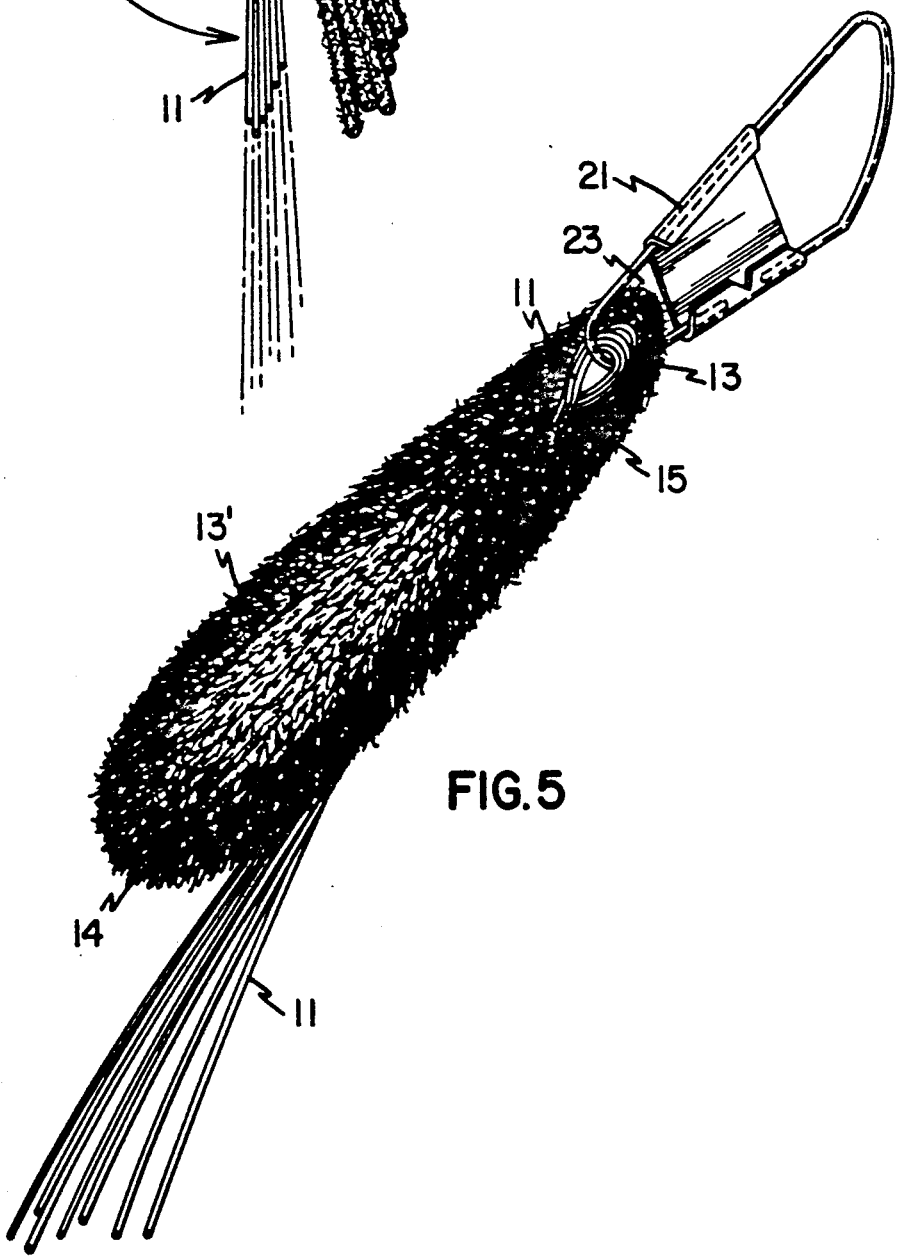
FIG. 5 is a perspective view of an alternative embodiment of the fishing lure attachment of the present invention.

Alternatively, as can be seen in FIGS. 3, 4 and 5, the fishing lure attachment of the present invention may be made using attachment means such as a spring connector 19 (FIG. 3) or a snap buckle 21 (FIGS. 4 and 5). In the case of a snap buckle 21, the fibrous strands 13 as well as the lock of filaments 11 are threaded through the lower eye 23 of the snap buckle 21. The filaments 11 and fiber strands 13 form a loop which secures the fishing lure attachment to the snap buckle 21. Then, similar to the previous embodiment, the fibrous strands 13 as well as the lock of filaments 11 are gathered generally in the middle. An adhesive 15 is applied adjacent the first end 12 of the formed tuft 13', FIG. 5.

Once formed and shaped, the fishing lure attachment of the present invention has three principal elements being the tuft 13', the trailing lock of filaments 11, and the attachment means 17, (FIGS. 2-5). The tuft 13' functions to impart a fish attracting color to the fishing lure attachment of the present invention. In that the tuft may comprise absorbent fibrous strands, the tuft 13' may also facilitate the shaping of the lure attachment and use of any number of commercially available liquid fish attracting scents, such as walleye scent sold under the trade name of Dr. Juice by Blue Fox Tackle Company of Cambridge, Minn.

Generally, any type of synthetic or natural fiber or yarn may be used in making the tuft region of the fishing lure attachment of the present invention. Preferably, the yarn selected will be absorbent and have a bulky character or appearance allowing the fiber to be shaped. Such shaping may be undertaken either by manually molding the tuft to the appropriate form or by using a scissors or other means to cut and form the tuft prior to use. Preferably, the yarn selected will also have a bright color such as a fluorescent orange or fluorescent green which will stand out when contrasted with a lake bottom, weeds, or any number of other elements which may be found in the area in which the lure attachment is used.

As can be seen in FIGS. 2, 3 and 5, a preferred embodiment of the tuft 13' of the present invention provides a body having an elongated shape and a cylindrical cross section. The tuft 13' is gathered and narrowed at the first end 12 as a result of the application of the adhesive 15 and the formation of the attachment means (17, 19, 21).

Preferably, the texture of the tuft 13' is soft and pliable resulting generally from the use of the bulky, absorbent fibers such as coarse wool yarn. When such a fiber 13 or yarn is used, the tuft 13, manifests a wooly if not furry appearance.

The second element of the fishing lure attachment of the present invention is the lock of filaments 11, FIGS. 2, 3 and 5. The filaments 11 function to provide a fishattracting color and shape to the present invention as well as forming the attachment means 17 at the first end 12 of the tuft.

Generally, any type of reflective flexible filament may be used in the present invention. Preferably, the filament used in the present invention imparts a fish attracting reflective character as the lure attachment moves through the water. This reflective character is especially desirable when the present invention is used in murkier waters often found in ponds or lake bottoms.

As can be seen in the preferred embodiment of the present invention shown in FIGS. 2, 3 and 5, the filaments may be shaped so as to trail from beneath the second end 14 of the tuft 13'.

The third element of the fishing lure attachment of the present invention is some means of affixing this invention to a hook, lure or leader. The attachment means functions to affix the present invention to the intended lure, hook, or leader which is to be used and may generally comprise any element which serves this purpose. As shown, the lock of filaments 11, FIG. 2, and alternatively the fiber strands 13, FIG. 4, may be used in making the means for attaching the present invention to any intended lure, hook, or other fishing tackle.

The simplest form of the attachment means, as seen in FIG. 2, is a loop 17 created by the folded end of the filaments 11 which extends from the first end 12 of the tuft 13'. The loop 17 may also be combined with any number of different attachment means. For instance, the fishing lure attachment shown in FIGS. 2, 3 and 5 has an attachment means comprising a loop 17, a spring connector 19, and a snap buckle 21, respectively.

Figure 6:
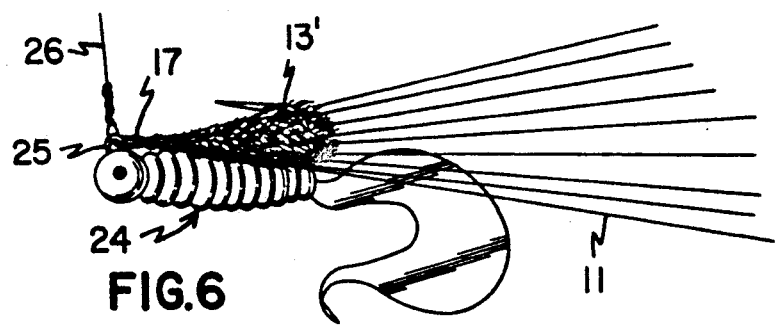
FIG. 6 is a perspective view of the fishing lure attachment of the present invention shown in FIG. 2 as shown attached to an exemplary lure which is not part of the invention.

In operation, the fishing lure attachment of the present invention may generally be used in combination with any type of fishing equipment. In the most basic form, the present fishing lure attachment may be used with an unbaited hook. The present invention may also be used with more elaborate lure configurations. For instance, as shown in FIG. 6, the present invention is connected to an eyelet of a fishing lure 24 which is attached to a line 26. The fishing lure attachment of the present invention may be affixed to lure 24 by either inserting the attachment means, in this case a loop 17 through the snap buckle 27 of the line 26 or placing the loop 17 over the eye hook 25 of fishing lure 24 prior to affixing the snap buckle 27 of the leader 26 onto the eye hook 25 of the fishing lure 26. The fishing lure attachment of the present invention may also hide the hook from view.

Figure 7:
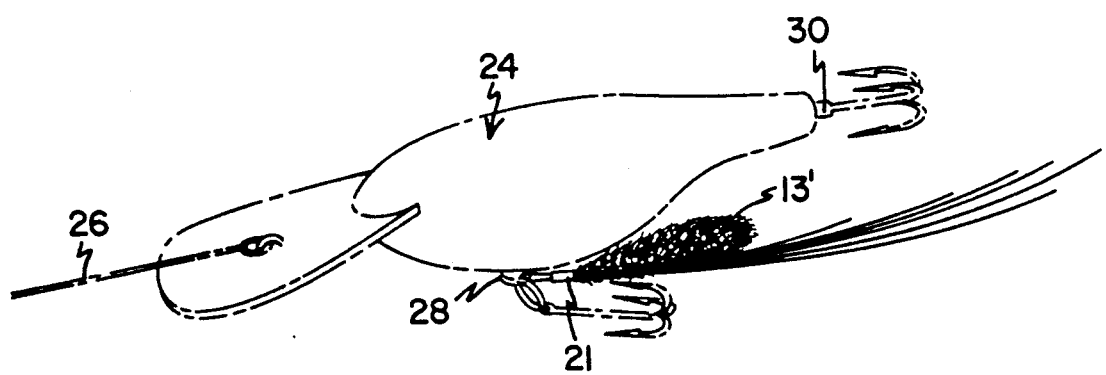
FIG. 7 is a perspective view of the fishing lure attachment of the present invention shown in FIG. 4 as shown attached to an exemplary lure which is not part of the invention.

Alternatively, as seen in FIG. 7 a snap buckle 21 may be used as the attachment means in the present invention. The fishing lure attachment may be affixed to any number of elements on any given fishing lure. For instance, the present fishing lure attachment may be affixed to the anal side 29 of the lure 24 at the eye 28 which holds one of the two hooks on the lure 24. The fishing lure attachment could also be affixed to the lure 24 at the eye 30 which holds adjacent the hook at the trailing end of the lure 24.

While I have disclosed a specific embodiment of my invention, it is to be understood that this is for the purpose of illustration only, and that my invention is to be limited solely by the scope of the appended claims.

I claim as my invention:

1. A fishing lure attachment comprising:
   (a) a tuft, said tuft having a first end and a second end and an elongated body;
   (b) a lock of strand-like filaments having a forward end and a trailing end;
   (c) means affixing said forward end of said filaments at said tuft first end so that said filaments extend beyond and trail from said tuft second end;
   (d) means at said tuft first end and filament forward end to attach said tuft and filaments to a fishing hook or lure; and
   (e) wherein said attachment means comprises a loop formed from at least said strand-like filaments.

2. The fishing lure attachment of claim 1 wherein said tuft is constructed of an absorbent material which may be treated with a fish attracting composition.

3. The fishing lure attachment of claim 1 wherein said tuft is colored orange.

4. A fishing lure attachment comprising:
   (a) a tuft, said tuft having a first end and a second end and an elongated body;
   (b) a lock of strand-like filaments having a forward end and a trailing end;
   (c) means affixing said forward end of said filaments at said tuft first end so that said filaments extend beyond and trail from said tuft second end;
   (d) means at said tuft first end and filament forward end to attach said tuft and filaments to a fishing hook or lure; and
   (e) wherein said filaments are folded to form a looped end comprising said attachment means and said tuft comprises a group of fibrous strands folded at said first end.

5. A fishing lure attachment comprising:
   (a) a lock of strand-like filaments folded to form a looped end;
   (b) a tuft having an elongated body shorter than said folded filaments; and
   (c) means affixing said tuft to the lock of strand-like filaments generally towards the looped end thereof to define said fishing lure attachment which has said elongated body with said filaments trailing therefrom and said looped end can be used to affix said fishing lure attachment to a fishing lure.

6. The fishing lure attachment of claim 5 wherein said affixing means is an adhesive.

7. The fishing lure attachment of claim 5 wherein said filaments are reflective and said tuft is colored.

8. The fishing lure attachment of claim 7 wherein said tuft color is chosen from the group consisting of green and orange, and said filaments are colored fluorescent chartreuse.

9. The fishing lure attachment of claim 5 wherein said tuft is constructed of an absorbent material which may be treated with a fish attracting composition.

10. A fishing lure attachment comprising:
    (a) attachment means;
    (b) a lock of strand-like reflective filaments inserted through said attachment means and folded generally in the middle to form a looped end; and
    (c) a tuft comprising a group of yarn strands additionally inserted through said attachment means and folded generally in the middle to form a tuft looped end, once folded said tuft having a looped end and a second end and an elongated oblong body having a generally circular cross section, said tuft looped end being gathered and affixed adjacent to the looped end of the lock of strand-like reflective filaments.

11. The fishing lure attachment of claim 10 wherein said attachment means comprises a snap buckle.

12. The fishing lure attachment of claim 10 wherein said tuft is constructed of an absorbent material which may be treated with a fish attracting composition.

13. The fishing lure attachment of claim 10 wherein said tuft is colored and said color is chosen from the group consisting of green and orange, and wherein said filaments are colored fluorescent chartreuse.

14. The fishing lure attachment of claim 10 wherein said filaments are gathered and affixed to said tuft by an adhesive.

15. The fishing lure attachment of claim 10 wherein said folded filaments are longer than said folded yarn strands whereby said filaments trail behind said elongated tuft body.

* * * * *

UNITED STATES PATENT AND TRADEMARK OFFICE
CERTIFICATE OF CORRECTION

PATENT NO. : 5,027,543

DATED : July 2, 1991

INVENTOR(S) : Peterson

It is certified that error appears in the above-identified patent and that said Letters Patent is hereby corrected as shown below:

In Column 2, line 67, "13," should read --13'--.

In Column 3, line 3, "fishattracting" should read --fish attracting--.

Signed and Sealed this

Fifteenth Day of December, 1992

Attest:

DOUGLAS B. COMER

*Attesting Officer*  *Acting Commissioner of Patents and Trademarks*